(12) United States Patent
Flott et al.

(10) Patent No.: US 7,782,775 B2
(45) Date of Patent: *Aug. 24, 2010

(54) SYSTEM AND METHOD FOR DYNAMIC BANDWIDTH ALLOCATION FOR VIDEOCONFERENCING IN LOSSY PACKET SWITCHED NETWORKS

(75) Inventors: Richard Flott, Austin, TX (US); Michael Horowitz, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 11/943,912

(22) Filed: Nov. 21, 2007

(65) Prior Publication Data

US 2008/0117819 A1 May 22, 2008

Related U.S. Application Data

(63) Continuation of application No. 10/305,485, filed on Nov. 26, 2002, now Pat. No. 7,317,685.

(60) Provisional application No. 60/333,449, filed on Nov. 26, 2001.

(51) Int. Cl.
*H04L 12/26* (2006.01)

(52) U.S. Cl. .................... 370/232; 370/253

(58) Field of Classification Search ........ 370/232–235, 370/241, 253, 352, 389, 392
See application file for complete search history.

(56) References Cited

U.S. PATENT DOCUMENTS

| 6,529,475 | B1* | 3/2003 | Wan et al. | 370/231 |
|---|---|---|---|---|
| 6,643,496 | B1* | 11/2003 | Shimoyama et al. | 455/69 |
| 6,741,569 | B1* | 5/2004 | Clark | 370/252 |
| 6,958,974 | B1* | 10/2005 | Prehofer | 370/235 |
| 6,990,074 | B2* | 1/2006 | Wan et al. | 370/235 |
| 2003/0016627 | A1* | 1/2003 | MeLampy et al. | 370/235 |
| 2003/0142625 | A1* | 7/2003 | Wan et al. | 370/235 |
| 2004/0252700 | A1* | 12/2004 | Anandakumar et al. | 370/395.21 |
| 2004/0252701 | A1* | 12/2004 | Anandakumar et al. | 370/395.21 |
| 2006/0039280 | A1* | 2/2006 | Anandakumar et al. | 370/229 |

* cited by examiner

*Primary Examiner*—Hong Cho
(74) *Attorney, Agent, or Firm*—Wong, Cabello, Lutsch, Rutherford & Brucculeri, L.L.P.

(57) ABSTRACT

A system and method for adjusting a video bit rate (VBR) over a network includes reducing the VBR if the network incurs a packet loss (PL) that is greater than a PL threshold increasing the VBR if the PL is less than or equal to the PL threshold over a maximum integer number of time intervals and increasing the maximum integer number of time intervals if the PL is greater than the packet loss threshold at the increased VBR. In addition, the VBR is increased over consecutive time intervals until a maximum video bit rate is restored, if the PL over each consecutive time interval is less than or equal to the packet loss threshold.

6 Claims, 9 Drawing Sheets

SYSTEM AND METHOD FOR DYNAMIC BANDWIDTH ALLOCATION FOR VIDEOCONFERENCING IN LOSSY PACKET SWITCHED NETWORKS

CROSS REFERENCE TO RELATED APPLICATIONS

This application is a Continuation of U.S. patent application Ser. No. 10/305,485, filed Nov. 26, 2002 now U.S. Pat. No. 7,317,685, entitled "System and Method for Dynamic Bandwidth Allocation for Videoconferencing in Lossy Packet Switched Networks," which claims the benefit of Provisional Patent Application Ser. No. 60/333,449, filed Nov. 26, 2001, entitled "Method for Dynamic Bandwidth Allocation for Videoconferencing in Lossy Packet Switched Networks," which is incorporated herein by reference.

BACKGROUND OF THE INVENTION

1. Field of the Invention

The present invention relates to videoconferencing over packet switched networks and more particularly to reducing data loss in such networks.

2. Description of the Prior Art

Traditionally, videoconference applications transport compressed audio and video data streams over nearly lossless circuit switched networks such as POTS and ISDN phone lines. These networks typically have low error rates with less than a $10^{-5}$% probability of a bit error. Packet switched networks, on the other hand, often have much higher error rates.

FIG. 1 illustrates one type of loss that occurs in packet switched networks when packets are transferred from a high bandwidth network 100 to a low bandwidth network 110 through a router 120. Specifically, packet loss 130 is directly related to an amount by which an incoming bit rate on the high bandwidth network 100 exceeds a maximum outgoing bit rate 200 (FIG. 2A) on the low bandwidth network 110.

FIG. 2A illustrates a plot of regular traffic bit rate 210 passing through the router 120 (FIG. 1) over time. As long as the plot of regular traffic bit rate 210 never exceeds a maximum outgoing bit rate 200 of the low bandwidth network 110 (FIG. 1), a packet loss rate may be zero (i.e., packet loss 130 (FIG. 1) may be zero). Note that packet loss can occur for reasons other than just over subscription of bandwidth. However, as shown in FIG. 2B, when the router 120 receives a combination of regular traffic data and videoconferencing data via the high bandwidth network 100 (FIG. 1), a plot of combination traffic bit rate 230 exceeds the maximum outgoing bit rate 200. Thus the packet loss 130 is non-zero and the packet loss rate is greater than zero.

Packet loss of videoconferencing data has a negative impact on both audio and video portions of a videoconference. When packet loss is frequent, the audio portion may become laden with intermittent gaps of silence, and the video portion may exhibit a wide range of undesirable effects, including video freeze frame. Although, a loss of 5% to 15% of transmitted audio data can sometimes be tolerated (e.g., cell phone calls), a loss of as little as 1% of transmitted video data can make the video portion of the videoconference difficult to comprehend.

FIG. 3 illustrates four streams of data (320, 330, 340, 350) that typically are transported during a videoconference. Specifically, each endpoint 310 of a videoconferencing system (not shown) sends an outgoing audio stream 320 and an outgoing video stream 330 and receives an incoming audio stream 340 and an incoming video stream 350. Streams 320, 330, 340 and 350 are generally transmitted as separate Real Time Protocol (RTP) sessions, and are controlled separately, thus allowing certain participants in the videoconference to send or receive less than all the streams 320, 330, 340 and 350. Therefore, a participant may, for example, elect to receive only the incoming video stream 350 without the associated incoming audio stream 340 during the videoconference, or may elect to prevent the outgoing video stream 330 from being transmitted.

Associated with the RTP sessions, a Real Time Control Protocol (RTCP) monitors quality-of-service and conveys information about videoconferencing endpoints, such as the endpoint 310, during the videoconference. RTCP is based on a periodic endpoint transmission of control packets to all participants in the videoconference. As illustrated in FIG. 4, each audio stream 320 and 340 has an associated RTCP stream 420 and 440, respectively, and each video stream 330 and 350 has an associated RTCP stream 430 and 450, respectively. Approximately every 5 seconds, the endpoint 310 sends a Receiver Report (RR) RTCP packet and a Sender Report (SR) RTCP packet. Furthermore, SR packets include transmission and reception statistics from videoconference participants that are active senders, while RR packets include reception statistics from participants that are not active senders. Statistical information in the SR and RR packets includes a cumulative number of packets lost, a fraction of RTP data packets lost since a previous SR or RR packet was sent, and inter-arrival jitter.

While the RTP sessions provide endpoint-to-endpoint network transport functions suitable for applications transmitting real-time streams, such as audio and video streams, RTP sessions do not guarantee a quality-of-service for these streams. Therefore, there is a need in the art for dynamic bandwidth allocation in packet switched networks.

SUMMARY OF THE INVENTION

The present invention provides a system and method for adjusting a video bit rate (VBR) during transmission of video data from a local endpoint to a remote endpoint over a packet-switched network. The method includes reducing the VBR, if a packet loss (PL) over a previous transmission time interval is greater than a PL threshold. In one embodiment of the invention, if the VBR is greater than a previous VBR, and if transmission at the VBR incurs a packet loss greater than the packet loss threshold, then the VBR is reduced to the previous VBR (i.e., a last good video bit rate). In another embodiment of the invention, if the VBR is equal to or less than the previous VBR, and if transmission at the VBR incurs a packet loss greater than the packet loss threshold, then the VBR is reduced by applying a bit rate reduction factor to the VBR.

In another embodiment of the invention, the method increases a VBR by applying a bit rate enhancement factor to the VBR, if the PL is less than or equal to a PL threshold over a maximum integer number of time intervals. If transmission at the VBR incurs a packet loss greater than the packet loss threshold, the VBR is reduced. Then the method increases the maximum integer number of time intervals over which transmission of video data with packet loss less than or equal to the packet loss threshold must occur before the method attempts to again increase the VBR. In this embodiment of the invention, disruption to a videoconference over a bandwidth limited network is reduced since the maximum integer number of time intervals is increased between attempts to increase the VBR above the limited bandwidth of the network.

In yet another embodiment of the invention, the method increases a VBR by applying the bit rate enhancement factor to the VBR, if transmission at the VBR incurs a packet loss less than or equal to the packet loss threshold, and if the VBR is greater than a previous VBR. In this embodiment of the invention, a VBR that is reduced due to a burst of packet loss may be continuously increased over consecutive time intervals until a maximum video bit rate is restored.

In other embodiments of the invention, computer readable media for performing the methods described above are provided.

DETAILED DESCRIPTION OF EXEMPLARY EMBODIMENTS

Figure 5:
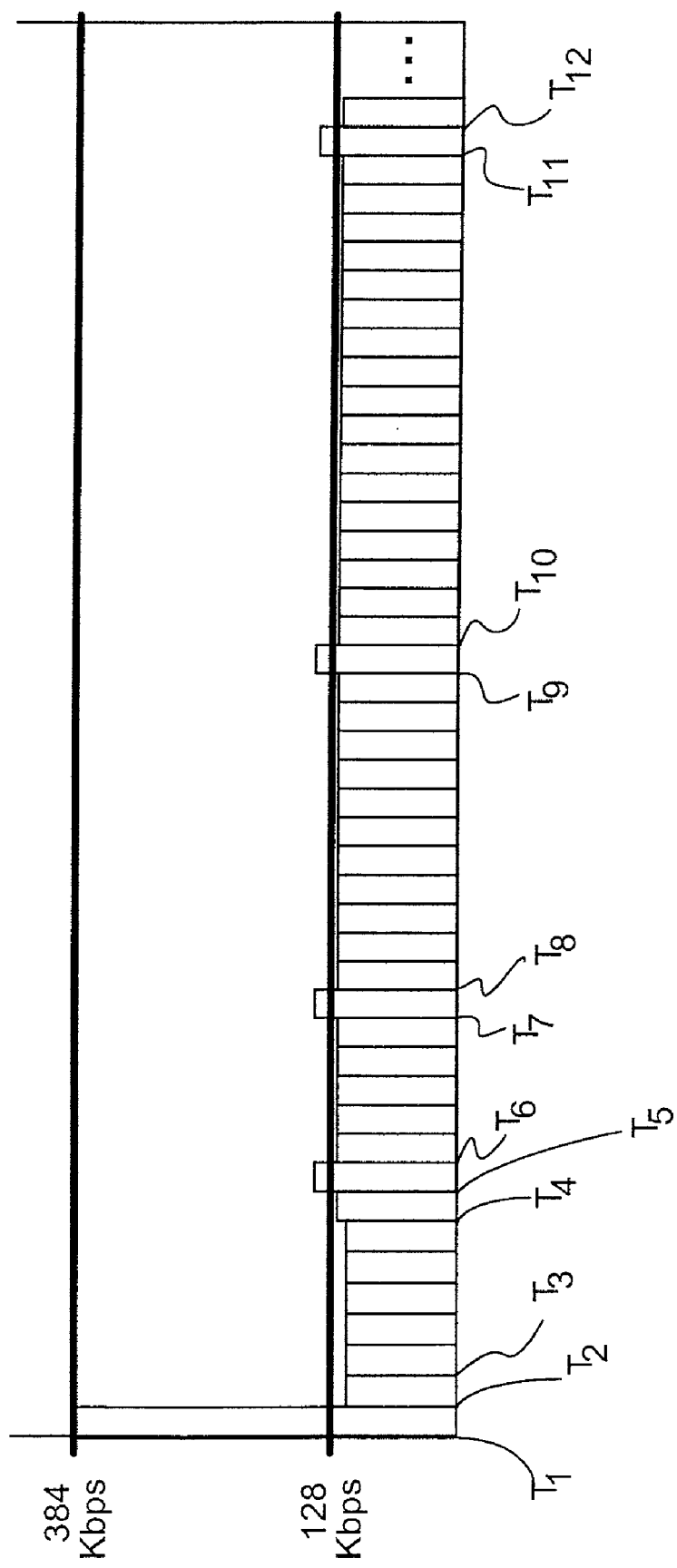
FIG. 5 is a graphical embodiment of a dynamic bit rate adjustment method illustrating video bit rate of a local endpoint versus time in a context of a limited bandwidth network, according to the present invention.

FIG. 5 is one graphical embodiment of a dynamic bit rate adjustment method illustrating video bit rate of a local (sending) endpoint versus time in a context of a limited bandwidth network, according to the present invention. In this embodiment of the invention, the dynamic bit rate adjustment method is enabled via the local videoconferencing endpoint, although the scope of the invention includes all software, hardware, and firmware embodiments of the invention. The local endpoint will be discussed in more detail in connection with FIG. 8.

At a time $T_1$, the exemplary local endpoint places a videoconference call (i.e., transmits video data) at a video bit rate (VBR) equal to a maximum video bit rate of 384 kilobits per second (Kbps) to a remote endpoint (not shown) on an exemplary network (not shown) capable of supporting a network video bit rate of 128 Kbps. Typically, the maximum video bit rate is a call bit rate minus the audio bit rate, and in the FIG. 5 exemplary embodiment of the invention, the call bit rate is 384 Kbps and the audio bit rate is 0 Kbps. Although in the FIG. 5 embodiment of the invention the audio bit rate is equal to zero for descriptive purposes, the scope of the invention covers non-zero audio bit rates. Since the network can only support the network video bit rate of 128 Kbps, the network incurs a loss of video data (i.e., video packets) between the time $T_1$ and a time $T_2$, resulting in a frozen video image at the remote endpoint. In fact, the network incurs an approximate 0.66 rate of packet loss (PL) on average, since in one embodiment PL=(VBR−RVBR)/VBR, where RVBR is a received video bit rate at the remote endpoint (e.g., PL=(384−128)/384=⅔=0.666 . . . 0.66 (truncated).

Next, at the time $T_2$, the local endpoint analyzes receiver report (RR) packets (not shown) sent from the remote endpoint and received by the local endpoint between a closest previous time (i.e., the time $T_1$) and the time $T_2$. The local endpoint determines the PL from the RR packets. If the PL is greater than a predetermined packet loss threshold, the local endpoint reduces the VBR by applying a bit rate reduction factor (BRRF) (e.g., multiplying the VBR by the BRRF). In one embodiment of the invention, BRRF=1.0−PL−$C_1$, where $C_1$ is a downward adjustment constant that may be set by a user of the local endpoint or upon initialization of the local endpoint. In this exemplary embodiment of the invention, $C_1$=0.05, and therefore the local endpoint transmits video data at the VBR=111 Kbps. A positive, non-zero downward adjustment constant allows the local endpoint to reduce the VBR below a network sustainable level associated with the packet loss PL.

In the FIG. 5 embodiment of the present invention, a difference between any two consecutive times, such as the time $T_1$ and the time $T_2$, is ten seconds, although the scope of the invention covers any time interval values between any two consecutive times.

Next, at a time $T_3$, the local endpoint receives and analyzes further RR packets, and determines that the network did not incur any video packet loss between the time $T_3$ and the previous time $T_2$. If the remote endpoint does not report any video packet loss for a predetermined integer number of time intervals N at a time $T_4$, the local endpoint sets a last good video bit rate (LVBR) to the (current) VBR, and then increases the VBR by applying a bit rate enhancement factor (BREF) to the VBR. In one embodiment of the invention, BREF=1.0+$C_2$, where $C_2$ is an upward adjustment constant that may be set by the user of the local endpoint or by the local endpoint upon initialization.

Subsequently, the local endpoint transmits video data to the remote endpoint at the increased VBR. In one embodiment of the invention, $C_2$=0.10, and thus the video bit rate is increased by 10%. For example, in the FIG. 5 exemplary embodiment, VBR=122 Kbps at the time $T_4$. In another embodiment of the present invention, the integer number of time intervals N=6, which is equivalent to a time duration of one minute if each time interval is ten seconds. In alternative embodiments, other numerical values may be used by any of the above-mentioned variables including N, $C_1$, and $C_2$.

According to the FIG. 5 embodiment of the invention, if at a next time $T_5$, the remote endpoint has not reported any video packet loss to the local endpoint via the RR packets, then the local endpoint resets the last good video bit rate (LVBR) to the (current) VBR of 122 Kbps. In addition, the local endpoint increases the VBR by applying the bit rate enhancement factor, and transmits video data to the remote endpoint at a new increased VBR.

In this exemplary embodiment of the present invention, the video data is now transmitted at the new VBR=134 Kbps at time $T_5$, which exceeds the network video bit rate of 128 Kbps. Consequently, the remote endpoint reports packet loss to the local endpoint via the RR packets at a time $T_6$. The local endpoint then reduces the VBR to the last good video bit rate (LVBR) of 122 Kbps, and transmits video data at the VBR=122 Kbps without any attempts to increase the VBR for N consecutive integer number of time intervals. However, if packet loss is detected by the remote endpoint before an elapse of N consecutive integer number of time intervals, then the VBR is decreased according to the bit rate reduction factor. Subsequently, the local endpoint does not attempt to increase the VBR until after transmission of video data for another N consecutive integer number of time intervals without packet loss.

Since at a time $T_7$ the remote endpoint has not reported any video packet loss to the local endpoint via the RR packets for N consecutive integer number of time intervals, the local endpoint again increases the VBR according to the bit rate enhancement factor, and transmits the video data to the remote endpoint at a new increased video bit rate VBR=134 Kbps.

However, since transmission of video data at 134 Kbps again exceeds the network video bit rate of 128 Kbps, the remote endpoint reports packet loss to the local endpoint via the RR packets at time $T_8$. The local endpoint then reduces the VBR to the last good video bit rate (LVBR) of 122 Kbps, and transmits video data without attempting to increase the VBR for 2N consecutive integer number of time intervals. However, if packet loss is detected by the remote endpoint before an elapse of 2N consecutive integer number of time intervals, then the VBR is decreased according to the bit rate reduction factor. Subsequently, the local endpoint does not attempt to increase the VBR until after transmission of video data over N consecutive integer number of time intervals without any packet loss.

According to this embodiment of the present invention, the above method repetitively attempts to increase the VBR, but only after continually increasing the time at which an increase in the VBR is attempted. For example, since at a time $T_9$ the remote endpoint has not reported any video packet loss to the local endpoint for 2N consecutive integer number of time intervals, then the local endpoint again increases the VBR according to the bit rate enhancement factor, and transmits the video data to the remote endpoint at the increased video bit rate VBR=134 Kbps. However, due to packet loss information received at time $T_{10}$, the local endpoint reduces the VBR to the last good video bit rate (LVBR) of 122 Kbps, and transmits video data without attempting to increase the VBR for 3N consecutive integer number of time intervals. For example, the local endpoint next attempts to increase the VBR at a time $T_{11}$.

According to the FIG. 5 embodiment, the present invention advantageously minimizes disturbance to the videoconference if a bandwidth of the network is less than the maximum video bit rate by continually increasing the time at which an increase in the VBR is attempted. That is, video quality degradation is minimized by increasing the period of time between video bit rate adjustments. However, if the network is only temporarily bandwidth-limited below the maximum video bit rate, then the present invention allows the VBR to eventually increase to the maximum video bit rate as discussed further below in conjunction with FIG. 6.

Figure 6:
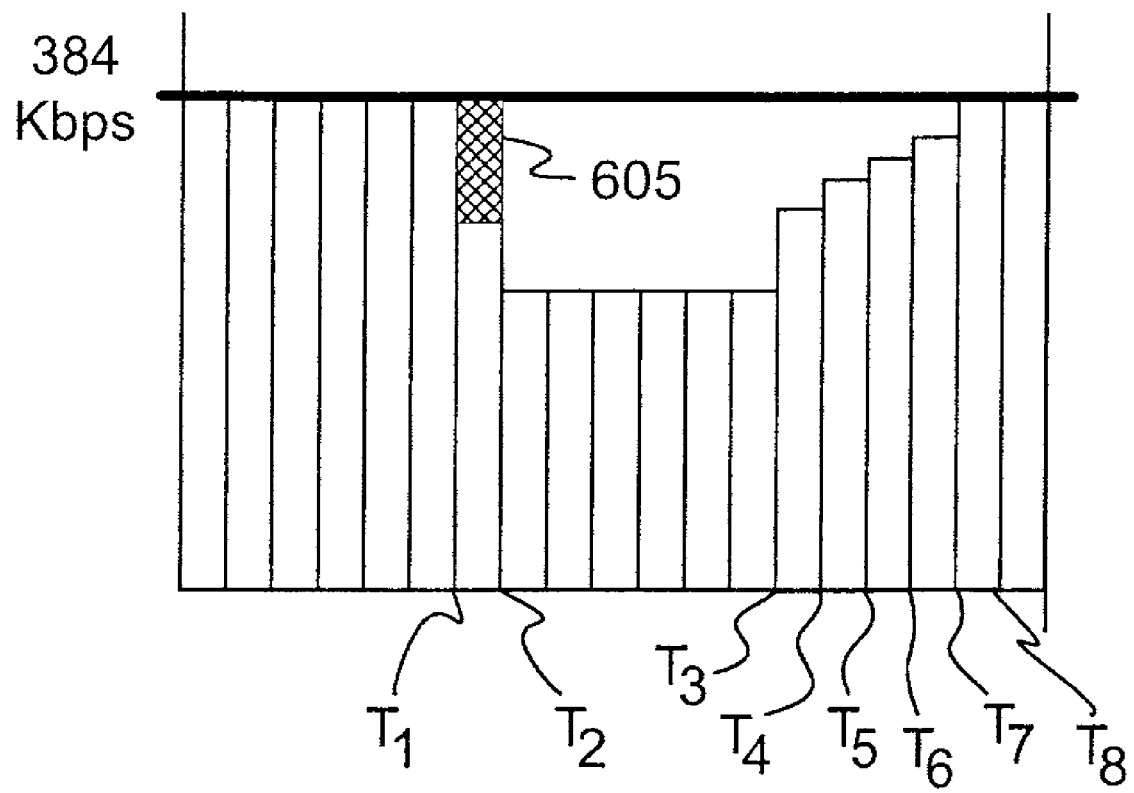
FIG. 6 is a graphical embodiment of a dynamic bit rate adjustment method illustrating video bit rate of a local endpoint versus time in the context of a burst of packet loss, according to the present invention.

FIG. 6 is one graphical embodiment of a dynamic bit rate adjustment method illustrating video bit rate of a local (sending) endpoint versus time in the context of a burst of packet loss, according to the present invention. Suppose the local endpoint places a properly connected 384 Kbps call (VBR=384) to a remote endpoint. Between a time $T_1$ and a time $T_2$ a 30% burst of packet loss 605 occurs (i.e., PL=0.30). At the time $T_2$, the local endpoint decreases the VBR by applying the bit rate reduction factor ($1.0-PL-C_1$), where $C_1=0.05$ and PL=0.3, in one embodiment of the invention, to reduce the VBR to 250 Kbps. The local endpoint then transmits video data at 250 Kbps to the remote endpoint. In alternative embodiments, $C_1$ may be set to other numerical values.

If the remote endpoint does not detect any further packet loss during a time delay $T_d$, then at a time $T_3$, where $T_3=T_2+T_d$, the local endpoint increases the VBR. The time delay $T_d$ is equivalent to the predetermined integer number of time intervals N as illustrated in the FIG. 5 embodiment of the invention. The increase in VBR is determined by applying the bit rate enhancement factor (i.e., 1 BREF=$1.0+C_2$), where $C_2=0.10$ in one embodiment of the invention, to increase the VBR to 275 Kbps. In one embodiment of the invention, $T_d=1.0$ minute, however in alternate embodiments of the invention, $T_d$ and $C_2$ may be set to any numerical value.

The method of the present invention repeatedly increases the VBR in a stair-step fashion (at times $T_4$, $T_5$, $T_6$, and $T_7$) until the VBR is restored to the maximum video bit rate of 384 Kbps. That is, if the remote endpoint does not detect any packet loss, the VBR is increased after each consecutive time interval. However, if packet loss occurs, then the VBR is reduced to a last good video bit rate at which packet loss did not occur, and the local endpoint does not attempt to increase the VBR until after the time delay $T_d$. Alternatively in some circumstances, the VBR is not increased until after some integer multiple of the time delay $T_d$.

The FIG. 6 embodiment of the present invention advantageously minimizes the disturbance to the videoconference caused by a burst of packet loss. The method provides for a reestablishment of the original maximum video bit rate in a timely manner.

Figure 1:
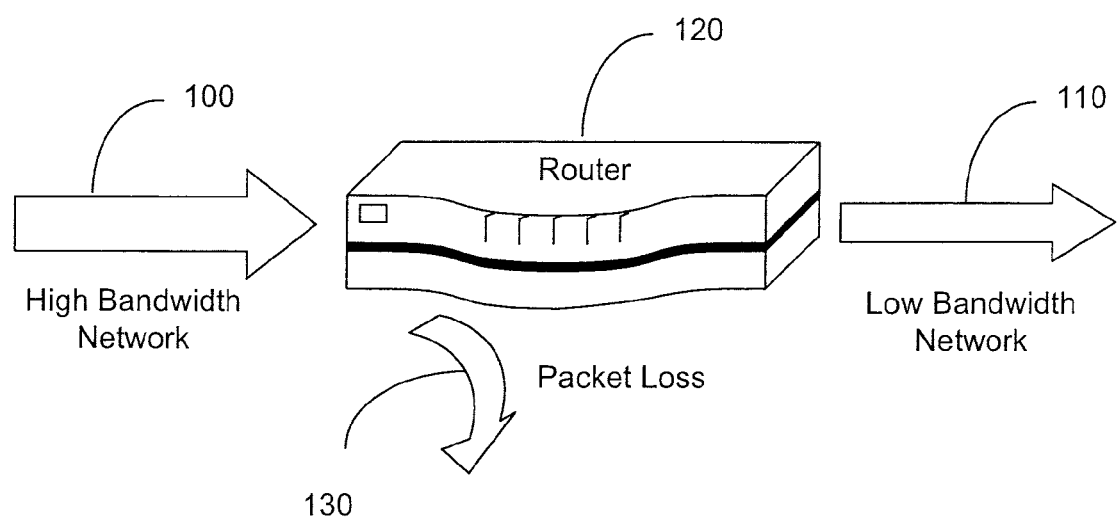
FIG. 1 is an illustration showing packet loss in a router.
Figure 2A:
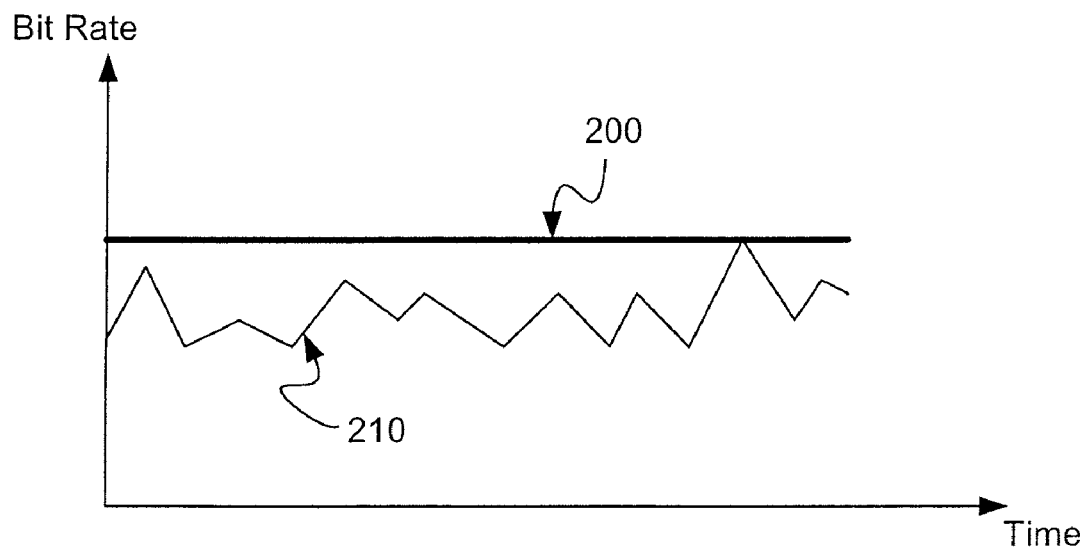
FIG. 2A is an illustration showing a lossless network connection.
Figure 2B:
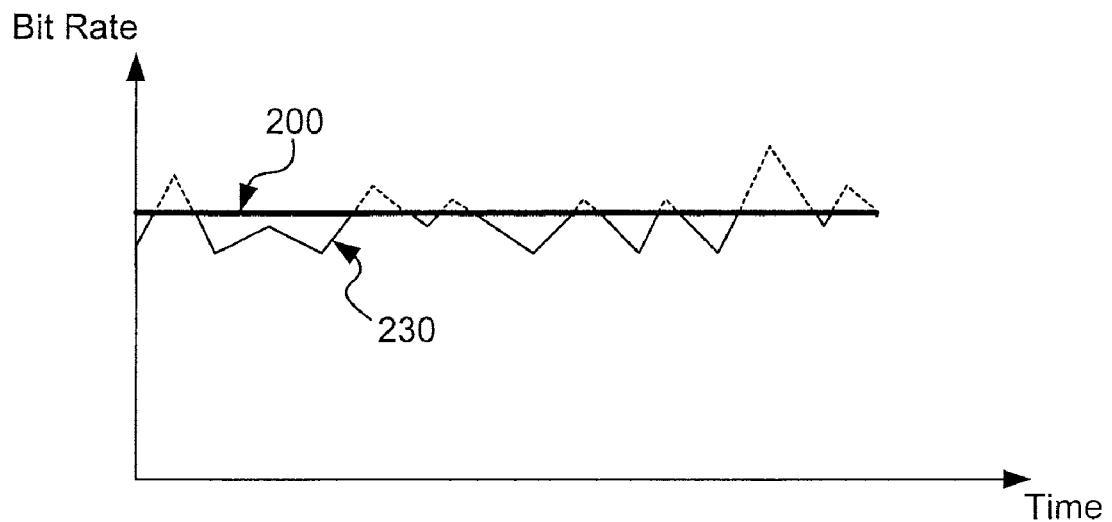
FIG. 2B is an illustration showing a network connection having packet loss.
Figure 3:
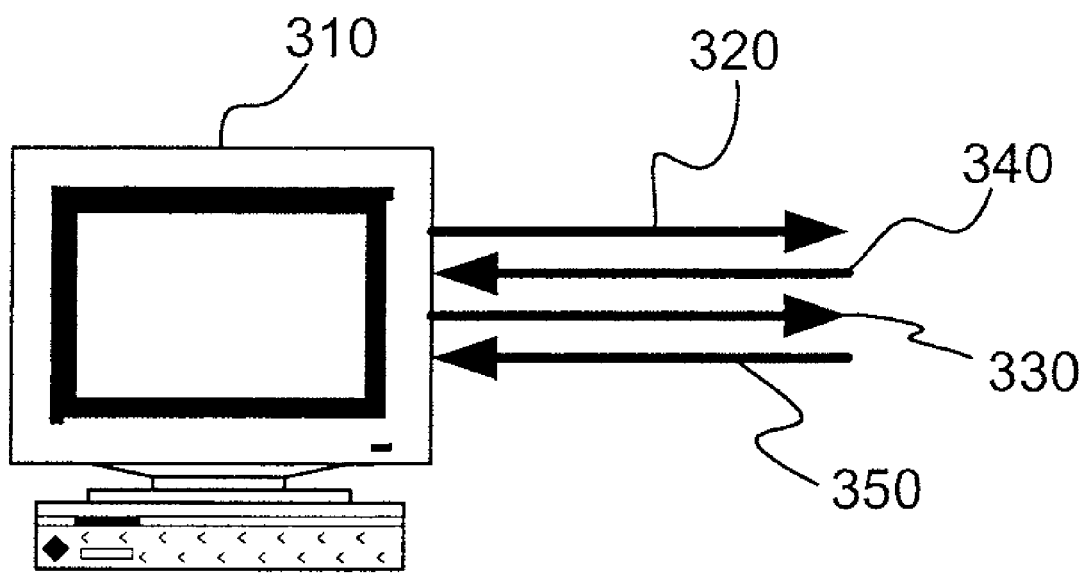
FIG. 3 is an illustration of RTP streams.
Figure 7A:
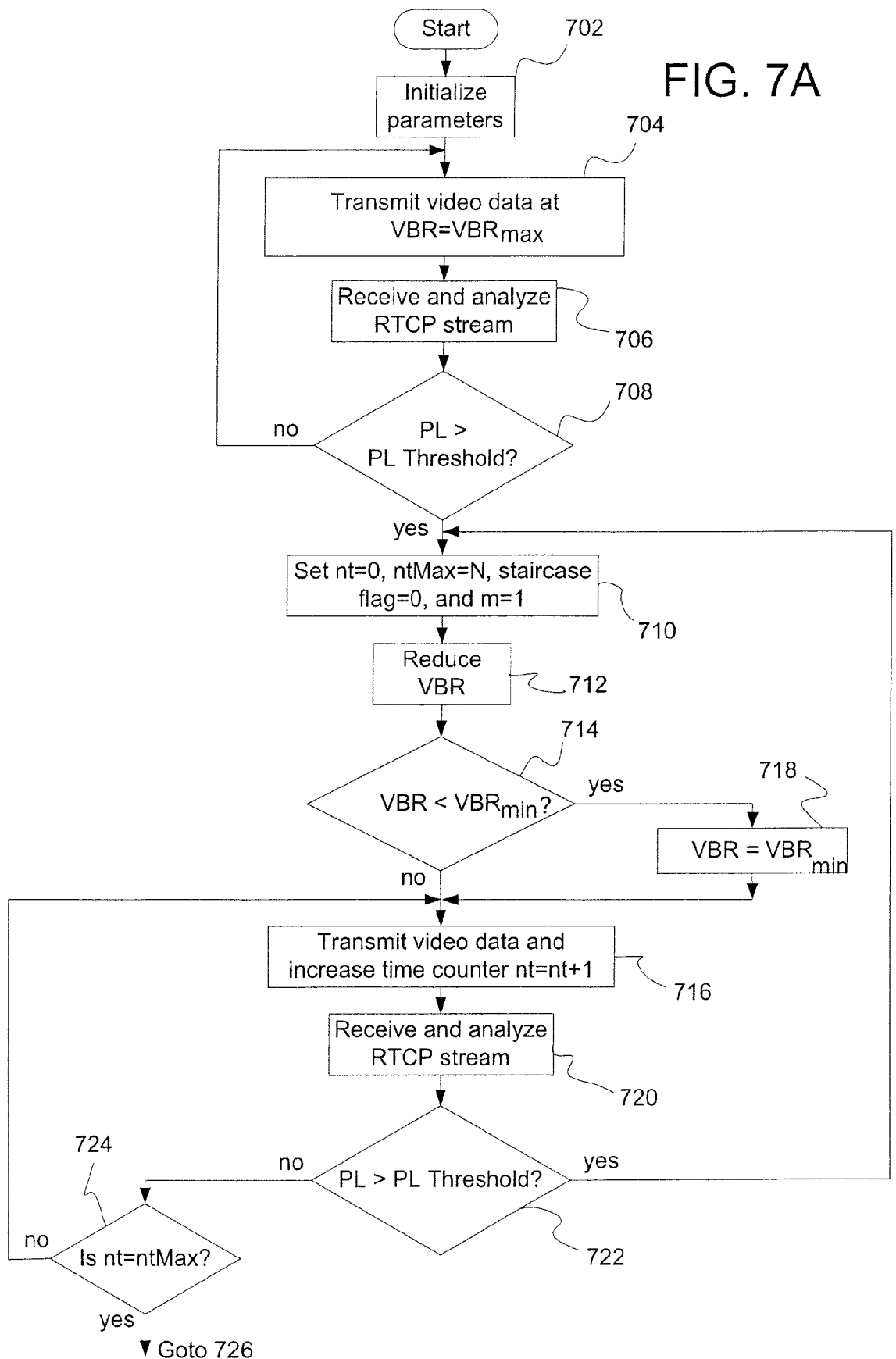
FIG. 7A is an exemplary flowchart of method steps for automatically adjusting a bit rate of an outgoing video stream in a videoconference, in accordance with the present invention.
Figure 7B:
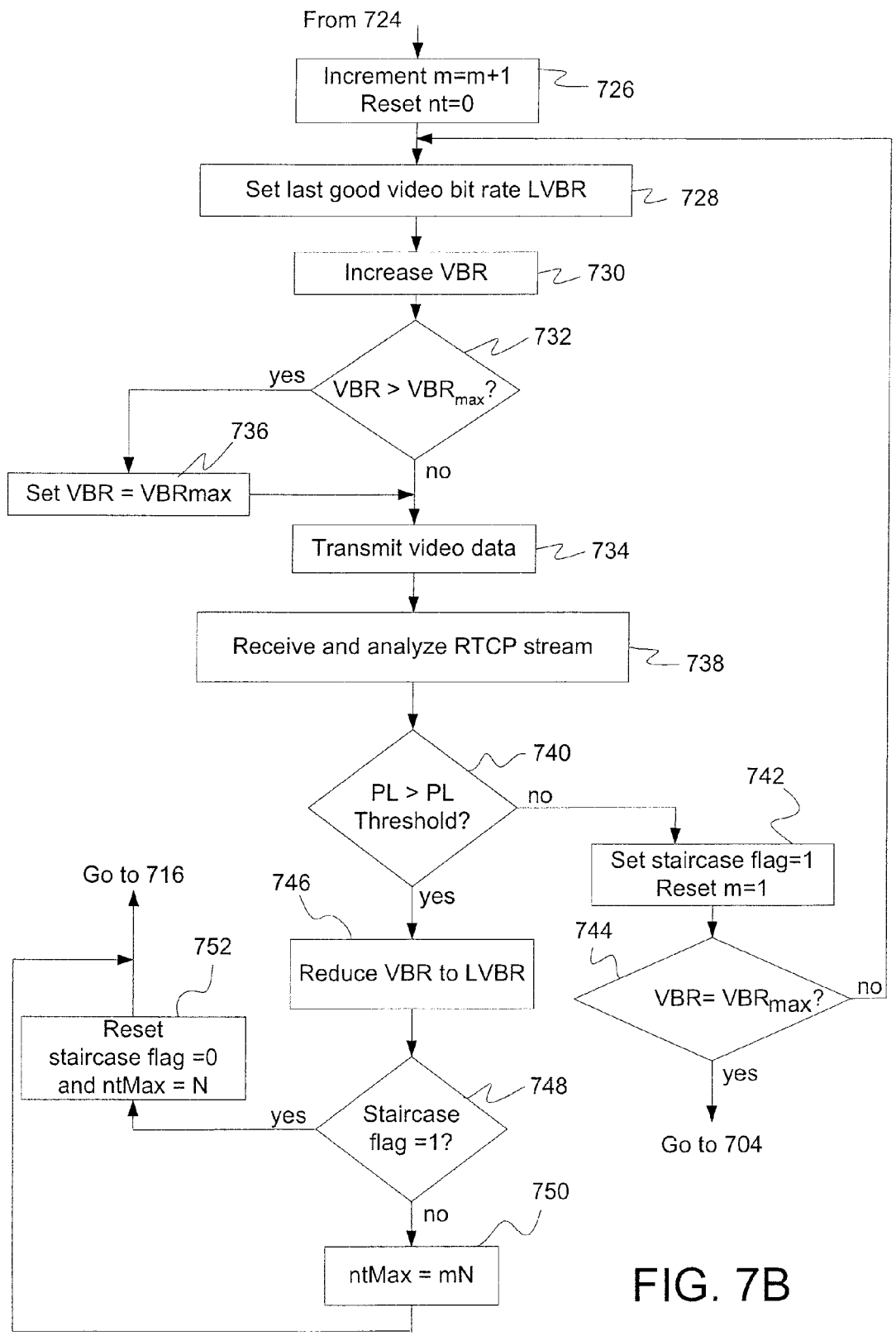
FIG. 7B is a continuation of the exemplary flowchart of FIG. 7A.

FIGS. 7A-7B illustrate an exemplary flowchart of method steps for automatically adjusting a bit rate of the outgoing video stream 330 (FIG. 3) in a videoconference in accordance with one embodiment of the invention. Although the outgoing audio stream 320 (FIG. 3) is not adjusted, one skilled in the art can extend the method to automatically adjust a bit rate of the outgoing audio stream 320, of so desired. However, since most audio streams have a fixed data rate, control of audio streams is usually limited to a selection of a type of control method, making such an adjustment unnecessary.

Figure 4:
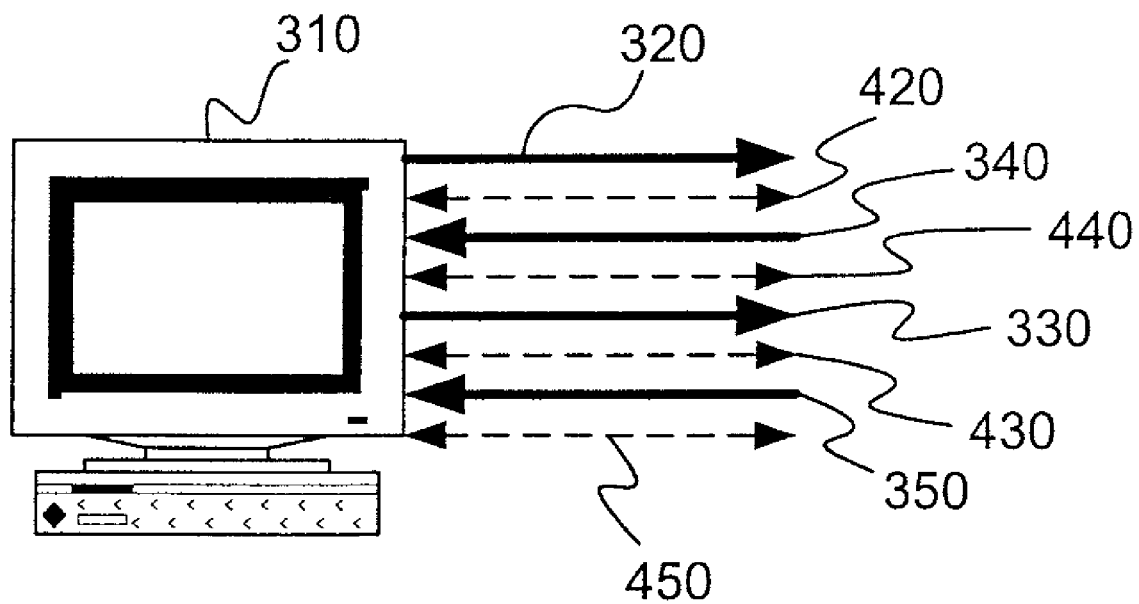
FIG. 4 is an illustration of RTCP streams.

First, in step 702 (FIG. 7A), a videoconferencing endpoint, such as the local endpoint 310 (FIG. 3 and FIG. 4) initializes videoconferencing parameters. For example, parameters include a minimum video bit rate threshold ("minimum threshold"), below which a videoconference is not deemed useful, and a maximum video bit rate ("maximum rate"), potentially determined by subtracting an audio bit rate from a call bit rate. The scope of the invention may cover other videoconferencing parameters as well, such as a downward adjustment constant used to determine a reduced video bit rate, an upward adjustment constant used to determine an increased video bit rate, a predetermined integer number of time intervals N, multiples of which are used to specify a number of time intervals between changes to the VBR, and a packet loss threshold value. The parameters might be set by a user of the local endpoint, pre-set by the makers of the local endpoint, or computed by the local endpoint using videoconferencing data received via a videoconferencing network (not shown). For example, the videoconferencing data may include statistical data and quality-of-service data, such as the call bit rate.

Next, in step 704, the local endpoint transmits video data (i.e., the outgoing video stream 330) at a video bit rate (VBR) equal to the maximum video bit rate to a remote endpoint. Then, in step 706, the local endpoint receives and analyzes the RTCP stream 430 (FIG. 4) received from the remote endpoint to determine packet loss (PL) in the outgoing video stream 330. In one embodiment of the invention, PL=(VBR−RVBR) VBR, where RVBR is a received video bit rate at a remote endpoint. The local endpoint may analyze the RTCP stream 430 on an individual RTCP packet basis or over multiple RTCP packets.

Next, in step 708, the local endpoint determines whether the packet loss is greater than the packet loss threshold. If the local endpoint ascertains that the determined packet loss is less than or equal to the packet loss threshold, then the method continues at step 704. However, if the determined packet loss is greater than the packet loss threshold (i.e., packet loss is deemed to be significant), then the local endpoint initializes operational parameters in step 710. For example, the endpoint sets a time interval counter nt=0, a maximum number of time intervals ntMax=N, where N is the predetermined integer number of time intervals, a staircase flag=0, and a downcount counter m=1. These flags and counters are used for illustrative purposes to assist in the description of the present invention as embodied in FIGS. 7A-7B, and may or may not be implemented in other embodiments of the present invention.

Next, in step 712, the local endpoint reduces the VBR by applying a bit rate reduction factor (i.e., BRRF=1.0−PL−$C_1$). In one embodiment of the invention, $C_1$=0.05. According to yet another embodiment of the invention, the VBR may not be less than the minimum video bit rate threshold. For example, the minimum video bit rate threshold may be 45 Kbps. If, at step 714, the local endpoint ascertains that the VBR is greater than or equal to the minimum video bit rate threshold, then the local endpoint transmits video data at the VBR and increments the time interval counter by one, at step 716. However, if in step 714, the VBR is less than the minimum video bit rate threshold, then the VBR is set to the minimum video bit rate threshold in step 718, and the method continues at step 716.

In step 720, the local endpoint receives and analyzes the RTCP stream 430 from the remote endpoint to determine packet loss (PL) in the outgoing video stream 330. Subsequently, in step 722, if the local endpoint determines that the packet loss is greater than the packet loss threshold, then the method loops back to step 710, and the VBR reduction process is repeated.

Alternatively, if in step 722 the local endpoint determines that the packet loss is less than or equal to the packet loss threshold, then the local endpoint ascertains if the time interval counter nt is equal to the maximum number of time intervals ntMax in step 724. If nt<ntMax, then the local endpoint does not increase the video bit rate, and the method continues at step 716. However, if at step 724 the local endpoint has transmitted ntMax consecutive time intervals of video data (i.e., nt=ntMax) without packet loss greater than the packet loss threshold, then the method continues at step 726 (FIG. 7B). In step 726, the local endpoint resets the time interval counter nt=0 and increments the downcount counter m=m+1.

In step 728, the local endpoint sets a last good video bit rate (LVBR) to the video bit rate (VBR) to ensure that if packet loss occurs (step 736) after the VBR is increased (step 730), then the VBR can be reduced to the LVBR (step 742). Next, in step 730, the local endpoint increases the VBR by applying a bit rate enhancement factor (i.e., BREF=1.0+$C_2$). In one embodiment of the invention, $C_2$=0.10, and thus the VBR is increased by 10%. Then, in step 732, the local endpoint compares the increased VBR to the maximum video bit rate. If the local endpoint ascertains that the increased VBR is less than or equal to the maximum video bit rate, then the local endpoint transmits video data at the increased VBR in step 734. However, if in step 732, the increased VBR is greater than the maximum video bit rate, then the VBR is set to the maximum video bit rate in step 736, and the method continues at step 734. In alternate embodiments, $C_2$ may be set to other values.

Next, the local endpoint then receives the RTCP stream 430 from the remote endpoint and analyzes the RTCP stream for packet loss in step 738. If, in step 740, the local endpoint ascertains that the packet loss is less than or equal to the packet loss threshold, then in step 742, the local endpoint turns on the staircase flag (i.e., set staircase flag=1) and resets the downcount counter m=1. In one embodiment of the invention, the local endpoint uses the staircase flag and the downcount counter as indicators to determine how to reset the maximum number of time intervals ntMax, as will be discussed further below in conjunction with steps 748-752.

Next, in step 744, if the local endpoint determines that the video bit rate is equal to the maximum video bit rate (VBR=VBRmax), then the method continues at step 704 (FIG. 7A). However, if in step 744 the video bit rate is less than the maximum video bit rate, the local endpoint sets the last good video bit rate to the VBR and increases the VBR in steps 728-730 as previously described. The method then continues at step 732.

Referring back to step 740, if the local endpoint determines that the packet loss is greater than the packet loss threshold, then in step 746, the local endpoint reduces the VBR to the last good video bit rate (LVBR). Next, in step 748, the local endpoint examines the staircase flag. If, in step 748, the staircase flag=0, then the local endpoint has transmitted video data at the VBR=LVBR for ntMax consecutive time intervals without any packet loss before the detection of packet loss (at step 740) at the increased VBR (at step 730). Therefore, in step 750, the local endpoint increases the maximum number of time intervals (ntMax) required for video data to be transmitted with a packet loss less than or equal to the packet loss threshold before the local endpoint once again increases the VBR (in step 730) so as to minimize disruption to the videoconference. In one embodiment of the invention, ntMax=mN, where m is the downcount counter which increases by one every time the local endpoint transmits video data for ntMax consecutive time intervals with packet loss less than or equal to the packet loss threshold. The method then continues at step 716 (FIG. 7A).

If, in step 748, the staircase flag=1, then the local endpoint has transmitted video data at the VBR without packet loss greater than the packet loss threshold for only one time interval. Therefore in step 752, the local endpoint resets the staircase flag=0, and resets the maximum number of time intervals ntMax=N, and the method continues at step 716.

Figure 8:
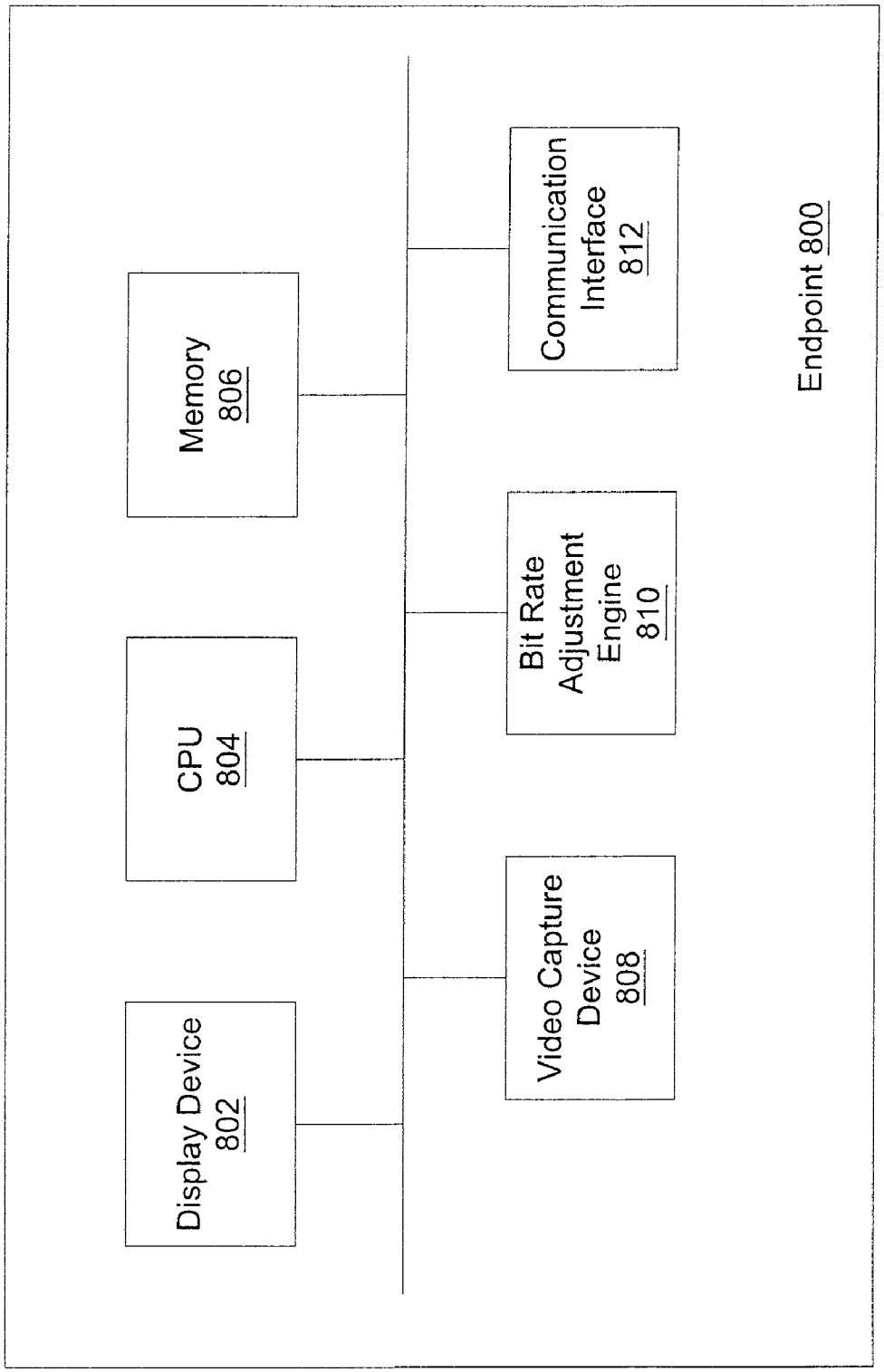
FIG. 8 is a block diagram of an exemplary endpoint.

FIG. 8 is a block diagram of an exemplary endpoint 800. For simplicity, the endpoint 800 will be described as the local (sending) endpoint referred to throughout the specification, although the remote endpoint may contain a similar configuration. In one embodiment, the endpoint 800 includes a display device 802, a CPU 804, a memory 806, at least one video capture device 808, a bit rate adjustment engine 810, and a communication interface 812. Alternatively, other devices may be provided in the endpoint 800, or not all above named devices provided.

The at least one video capture device 808 captures images of a local user, conference room, or other scenes, which will be sent to the remote endpoint during a videoconference. The at least one video capture device 808 may be implemented as a charge coupled device (CCD) camera, a complementary metal oxide semiconductor (CMOS) camera, or any other type of image capture device.

In this exemplary embodiment, the bit rate adjustment engine 810 performs all bit rate adjustments for the endpoint 800 as described supra. These adjustments include, but are not limited to, bit rate reduction and bit rate enhancement. The bit rate adjustment engine 810 may also contain all preset and/or user set values for variables (e.g., $C_1$, $C_2$, N, a packet loss threshold, and a minimum video bit rate threshold) necessary for bit rate adjustment. In an alternative embodiment, these values may be stored in the memory 806.

The communication interface 812 forward video and audio streams from the endpoint 800 to at least one remote endpoint, while receiving remote video and audio streams from the at least one remote endpoint. Because the remote video and audio streams may be received at different rates, the endpoint 800 will have to buffer the streams such that the correct video and audio streams are simultaneously displayed (on the display device 802) and heard (on speakers not shown) together.

The methods described herein can also be implemented as computer-executable instructions stored in computer-readable media such as magnetic or optical storage disks, computer memories, including read-only and random access memories, and the like.

The present invention has been explained above with reference to exemplary embodiments. It will be evident to those skilled in the art that various modifications may be made thereto without departing from the broader spirit and scope of the invention. For example, methods other than RTCP can be used with this invention to relay packet loss from receivers to senders, although RTCP is a preferred method. Further, although the present invention has been described in the context of its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

What is claimed is:

1. A computer-readable medium having embodied thereon a program, the program being executable by a machine to perform a method for adjusting a video bit rate (VBR) during transmission of video data over a packet-switched network, the method comprising:
   reducing the VBR to no less than a minimum video bit rate threshold (VBRmin), if a packet loss (PL) over a time interval is greater than a PL threshold;
   increasing the reduced VBR by a bit rate enhancement factor (BREF) to obtain a second VBR, if the PL over a maximum integer number of time intervals (ntMax) is less than or equal to the PL threshold;
   increasing the ntMax if the PL at the second VBR is greater than the PL threshold; and
   increasing the second VBR by the BREF for each consecutive time interval until a VBRmax is reached, if the PL for each previous time interval is less than or equal to the PL threshold.

2. The computer-readable medium of claim 1, wherein reducing the VBR further comprises reducing the VBR by a bit rate reduction factor (BREF), if the VBR is equal to or less than previous VBR.

3. The computer-readable medium of claim 1, wherein reducing the VBR further comprises reducing the VBR to a last good VBR (LVBR), if the VBR is greater than a previous VBR.

4. The computer-readable medium of claim 1, further comprising reducing the second VBR to a VBR of a last time interval without packet loss, if the PL at the second VBR is greater than the PL threshold.

5. A computer-readable medium having embodied thereon a program, the program being executable by a machine to perform method steps for increasing a maximum integer number of time intervals (ntMax) between adjustments to a video bit rate (VBR) during transmission of a video data over a packet-switched network, the method steps comprising:
   increasing a first VBR by a bit rate enhancement factor (BREF) to obtain a second VBR, if the PL over the ntMax is less than or equal to the PL threshold;
   increasing the ntMax by adding a predefined integer number of time intervals N to the ntMax, if the PL at the second VBR is greater than the PL threshold; and
   reducing the second VBR to the first VBR if the PL at the second VBR is greater than the PL threshold.

6. The computer-readable medium of claim 5, further comprising continuously repeating the steps of increasing a first VBR, increasing the ntMax, and reducing the second VBR.

* * * * *